R. J. DEARBORN.
SYSTEM OF ELECTRICAL DISTRIBUTION.
APPLICATION FILED DEC. 3, 1906.

941,362.

Patented Nov. 30, 1909.
2 SHEETS—SHEET 1.

WITNESSES
Fred H. Miller
Otto S. Schairer

INVENTOR
Richard J. Dearborn
BY
Wesley G. Carr
ATTORNEY

R. J. DEARBORN.
SYSTEM OF ELECTRICAL DISTRIBUTION.
APPLICATION FILED DEC. 3, 1906.

941,362.

Patented Nov. 30, 1909.
2 SHEETS—SHEET 2.

WITNESSES:
Fred H Miller
Otto S. Schaner

INVENTOR
Richard J. Dearborn
BY
Wesley J. Carr
ATTORNEY

UNITED STATES PATENT OFFICE.

RICHARD J. DEARBORN, OF WILKINSBURG, PENNSYLVANIA, ASSIGNOR TO WESTINGHOUSE ELECTRIC & MANUFACTURING COMPANY, A CORPORATION OF PENNSYLVANIA.

SYSTEM OF ELECTRICAL DISTRIBUTION.

941,362. Specification of Letters Patent. Patented Nov. 30, 1909.

Application filed December 3, 1906. Serial No. 346,071.

*To all whom it may concern:*

Be it known that I, RICHARD J. DEARBORN, a citizen of the United States, and a resident of Wilkinsburg, in the county of Allegheny and State of Pennsylvania, have invented a new and useful Improvement in Systems of Electrical Distribution, of which the following is a specification.

My invention relates to systems of alternating current electrical distribution, and it has for its object to provide means that shall be simple in arrangement and effective in operation for automatically maintaining a substantially constant current in an electric supply circuit when the demands upon the system are variable.

My improved equalizing system comprises, in general, an alternating current supply circuit, a current-rectifying device, a storage battery connected thereto and a transformer-regulator interposed between the supply circuit and the current rectifier. The transformer-regulator is connected to the circuit between the source of supply and the variable load so that the capacity of the former may be materially reduced, current being taken from the circuit or supplied to it as the requirements of the latter are below or above the average.

One of the principal advantages in the aforesaid arrangement lies in the fact that the storage battery is capable of supplying energy through the rectifier for a considerable period of time while equalizers which store energy in heavy fly-wheels are only capable of delivering current to the circuit for a relatively short time.

Furthermore, a positive regulation is effected, whereby stable conditions obtain in the system after a correction is made for any variation in the load from the average, the next succeeding load-variation bringing about only such further correction as is then necessary in either direction.

Figure 1:
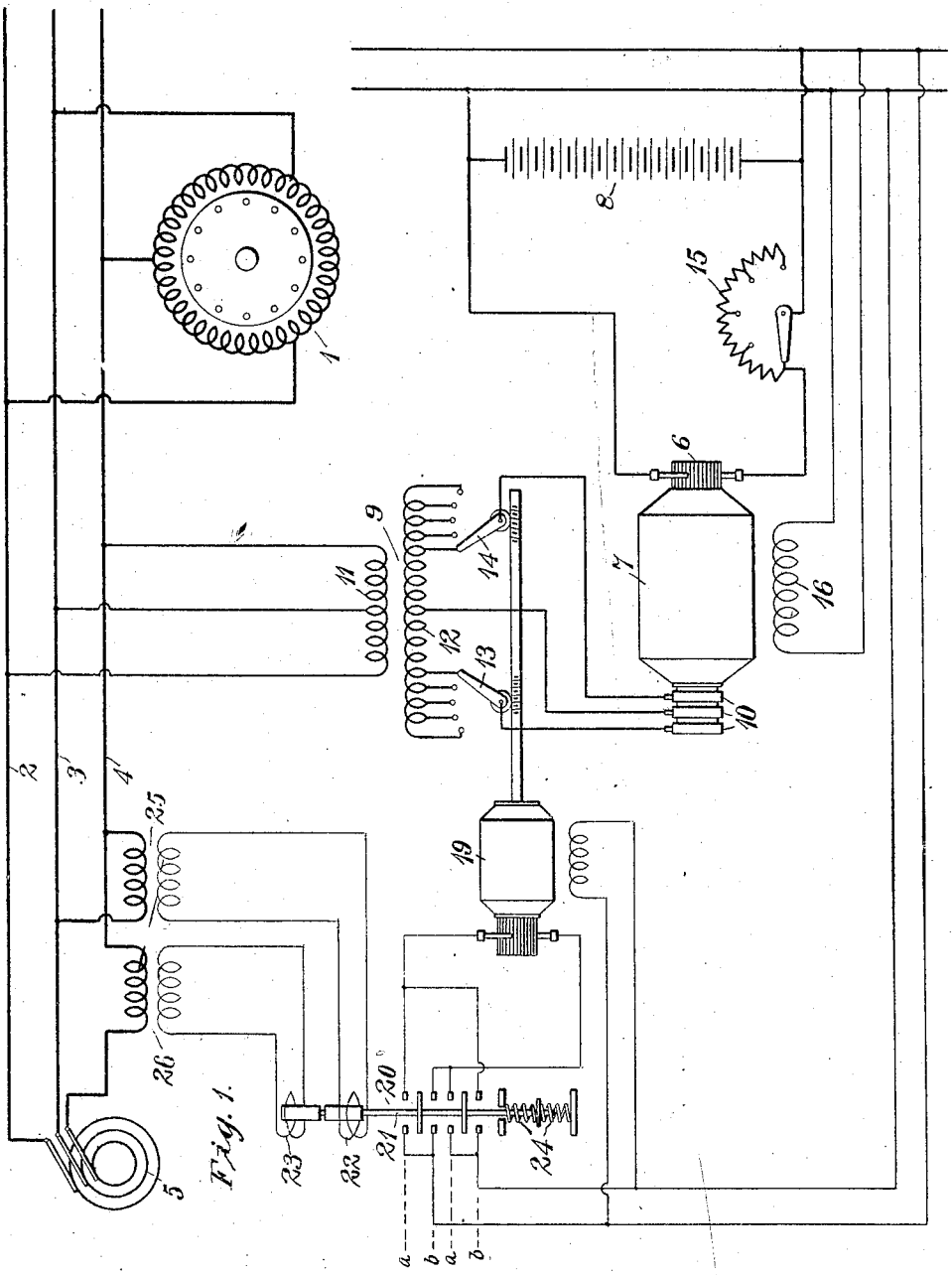
Figure 2:
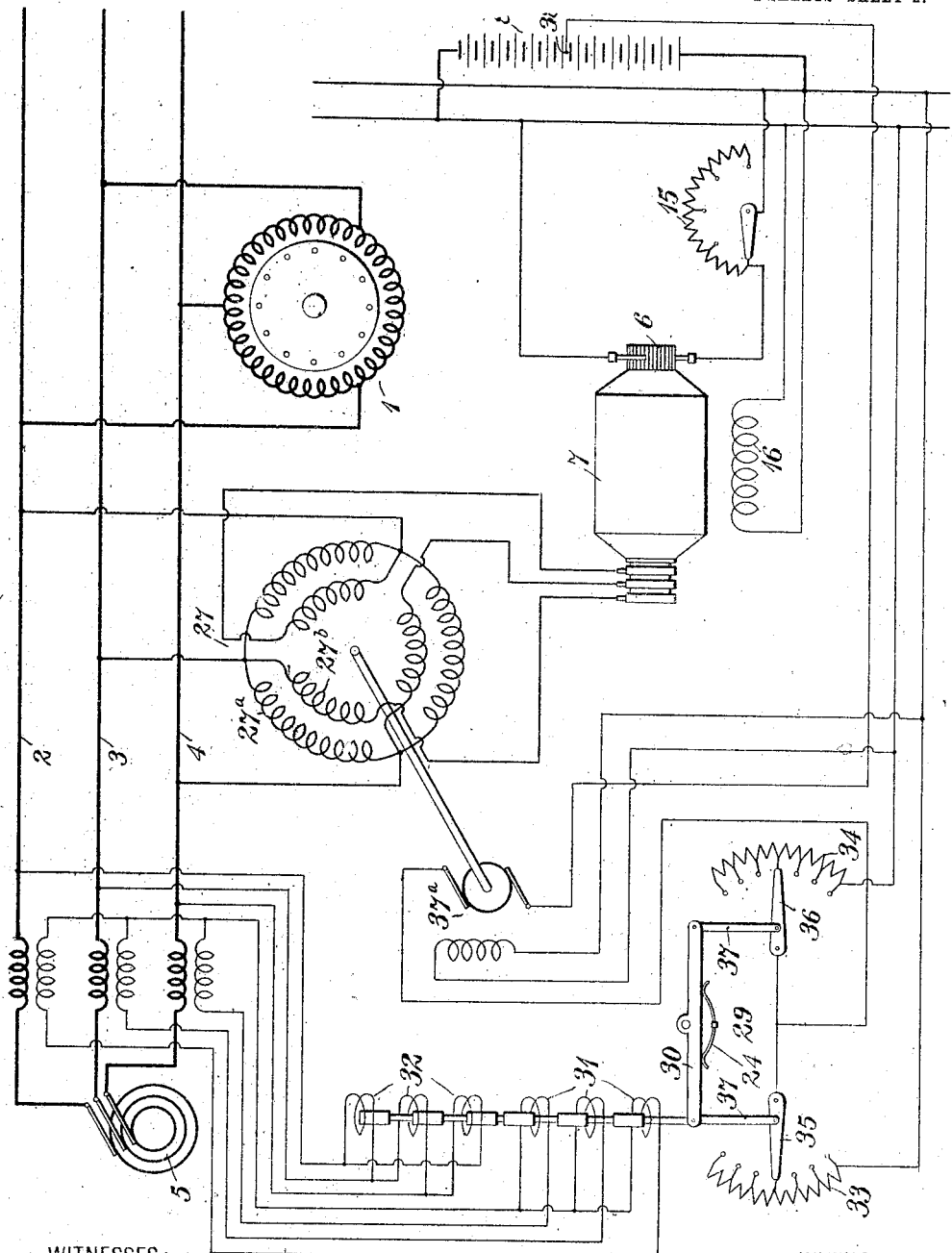

Figures 1 and 2 of the accompanying drawings are diagrammatic views of systems of distribution that embody my invention.

Referring to Fig. 1, alternating current electrical energy is supplied to a variable load 1 through conductors 2, 3 and 4 from any suitable source, such as a three-phase generator 5. The commutator 6 of a rotary converter 7 is connected to a storage battery 8 and a three-phase transformer-regulator 9 is connected to the conductors 2, 3 and 4 between the generator 5 and the load 1, and to collector rings 10 of the rotary converter. The transformer-regulator 9 comprises a V-connected primary winding 11 and a secondary winding 12 the active convolutions of which may be varied by means of regulating arms 13 and 14. The rotary converter 7 is provided with a starting rheostat 15 which may be interposed between the terminals of the storage battery and the commutator 6 and a field magnet winding 16 which may be energized from any convenient source.

The operation of the system is as follows: Assuming that electrical energy is delivered from the generator 5 at a substantially constant potential; that the rotary converter 7 is operating in synchronism with the generator and that, when the dials 13 and 14 occupy their mid regulating positions, the normal voltage of the storage battery corresponds to the direct current voltage of the rotary converter; the current delivered from the generator may be kept constant, when the load varies, by suitably changing the ratio of transformation between the primary and secondary windings of the transformer-regulator.

The foregoing general statement may be more readily understood if the characteristics of the several devices comprised in the system are considered. The normal voltage of the storage battery is determined by the number of its constituent cells and this number will be determined by the direct current voltage of the rotary converter under predetermined conditions. According to well known principles, the electromotive force ratio between the alternating current and direct current external circuits of the rotary converter is substantially constant and, consequently, if, by means of the transformer-regulator, its alternating current voltage is varied, its direct current voltage is proportionately varied, so that the battery voltage is higher or lower than that of the rotary converter and energy will be taken from, or supplied to, the battery.

In order to make the system automatic, I provide an operating motor 19 which may be of any suitable type and energized from any source and is adapted to actuate the regulator arms 13 and 14. The motor 19 is controlled by a reversing switch 20 comprising a movable contact-bearing member 21 which is governed by differential magnet coils 22 and 23 and which normally interrupts the motor circuit, since it is constrained to occupy its mid-position by reason of centering springs 24. The magnet coil 22 receives energy from a transformer 25 the primary winding of which is connected across the circuit 3—4 so that it exerts a substantially constant force in opposition to the magnet winding 23, which is energized from a series transformer 26, the primary coil of which is connected in the interrupted line conductor 4. By so designing the series and shunt transformers 25 and 26 as to deliver equal amounts of energy under average conditions of the load 1, the motor 19 is started in the one direction or the other according as the coil 22 or the coil 23 predominates.

If the current traversing the line conductor 4 exceeds a predetermined average amount, the reversing switch 20 occupies position a and energy is so supplied from the battery 8 to the motor 19 as to effect rotation in one direction and, if the current in the line conductor 4 falls below the predetermined amount, the reversing switch occupies position b and the motor is operated in the opposite direction.

The load on the system may be wholly or partially applied to the direct current circuit of the rotary converter without any change in the circuit connections for the regulator-motor.

Referring to Fig. 2, an induction regulator 27 is substituted for the regulator 9 of Fig. 1, its primary winding 27ª being connected in delta across the line conductors 2, 3 and 4, and its secondary coils 27ᵇ being interposed between the slip rings of the rotary converter and the line conductors.

The reversing switch 20 of Fig. 1 is replaced by a resistance-regulator 29 which comprises a rocking beam 30 that is actuated by two groups of differential coils 31 and 32, two similar resistances 33 and 34 and two movable contact arms 35 and 36 which respectively regulate the resistances and which are connected to opposite extremities of the rocking beam 30 by links 37. The terminals of a regulator motor 37ª, which corresponds to the motor 19, are connected between the movable contact arms 35 and 36, and the neutral point 38 of the battery 8, and corresponding ends of resistances 33 and 34 are connected to the extremities of the battery.

The group 32 of differential coils corresponds to the coil 22 of Fig. 1 and the group 31 of differential coils corresponds to the coil 23 of Fig. 1, one coil being provided for each phase of the distributing circuits in Fig. 2 in order that a compensation for a possible unbalancing may be effected. The operation of the motor-reversing regulator is as follows: Assuming that the two groups of differential coils are balanced and that one terminal of the motor is connected through the arms 35 and 36 to the middle points of the resistances 33 and 34, no electrical energy will be supplied to the motor, since the resistances of the two paths from opposite ends of the storage battery to its neutral point are equal and the electromotive forces exerted are in opposition to each other. If the rocking beam 30 is actuated by the differential coils 32 the portion of the resistance 33 included in the circuit will be increased while the corresponding portion of the resistance 34 will be decreased. Energy will now be supplied to the motor 19 in one direction since the circuits are unbalanced and energy will be supplied in a reverse direction when the active portion of the resistance 33 is less than that of the resistance 34, by reason of the predominance of the pull of the differential coil 31.

The operating motors 19 and 37ª may be provided in a well known manner with automatic cutout switches in order to interrupt their supply circuits at the limits of their travel. Means of this character is only necessary in case the regulator is incapable of compensating for the load variations, however. The fact that the operating motor windings are deënergized except when a change in load condition takes place is of special advantage in systems where the load is constant for a considerable length of time.

It is readily conceivable that other transformer-regulators of well known construction may be substituted for those illustrated, and that the circuit connections of the systems may be modified within the scope of my invention, consequently, I desire that only such limitations shall be imposed as are indicated in the appended claims.

I claim as my invention:

1. In a system of distribution, the combination with a polyphase alternating current circuit, a rotary converter and a storage battery connected thereto, of a voltage regulator connected to the circuit and to the rotary converter, an operating motor for varying the ratio of transformation in the regulator, and means dependent upon the mean current variations in the several conductors of said circuit above and below a predetermined amount for actuating the motor in its forward or in its reverse direction.

2. In a system of distribution, the combination with a polyphase alternating current circuit, a rotary converter, a storage battery connected to the direct current terminals of the rotary converter and a voltage regulator interposed between the circuit and the alternating current terminals of the rotary converter, of an electric motor for operating the regulator and a resistance-regulator dependent upon the mean current variations of the circuit above and below a predetermined value for controlling the motor.

In testimony whereof, I have hereunto subscribed my name this 30th day of November, 1906.

RICHARD J. DEARBORN.

Witnesses:
OTTO S. SCHAIRER,
BIRNEY HINES.